(12) United States Patent
Thon et al.

(10) Patent No.: US 8,350,218 B2
(45) Date of Patent: Jan. 8, 2013

(54) LIGHT DETECTION IN A PIXELATED PET DETECTOR

(75) Inventors: Andreas Thon, Aachen (DE); Torsten Solf, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 701 days.

(21) Appl. No.: 12/529,194

(22) PCT Filed: Feb. 14, 2008

(86) PCT No.: PCT/IB2008/050544
§ 371 (c)(1),
(2), (4) Date: Aug. 31, 2009

(87) PCT Pub. No.: WO2008/107808
PCT Pub. Date: Sep. 12, 2008

(65) Prior Publication Data
US 2010/0098311 A1  Apr. 22, 2010

Related U.S. Application Data

(60) Provisional application No. 60/892,890, filed on Mar. 5, 2007.

(51) Int. Cl.
*G01T 1/164* (2006.01)
*G01T 1/20* (2006.01)
(52) U.S. Cl. ............... 250/361 R; 250/363.03; 250/367; 250/370.11
(58) Field of Classification Search ............ 250/361 R, 250/363.03, 367, 379.11, 370.11
See application file for complete search history.

(56) References Cited

U.S. PATENT DOCUMENTS

| 4,560,877 | A  | * | 12/1985 | Hoffman | 250/366 |
| 4,948,978 | A  |   | 8/1990  | Guyot | |
| 6,449,331 | B1 | * | 9/2002  | Nutt et al. | 378/19 |
| 7,233,640 | B2 | * | 6/2007  | Ikhlef et al. | 378/19 |
| 7,723,694 | B2 | * | 5/2010  | Frach et al. | 250/370.11 |
| 2004/0178347 | A1 | * | 9/2004 | Murayama et al. | 250/367 |
| 2004/0179645 | A1 |   | 9/2004 | Hoffman et al. | |
| 2005/0104000 | A1 |   | 5/2005 | Kindem et al. | |
| 2005/0224719 | A1 | * | 10/2005 | Polichar et al. | 250/390.01 |
| 2006/0097133 | A1 | * | 5/2006 | Yaung | 250/214.1 |
| 2008/0073542 | A1 | * | 3/2008 | Siegel | 250/368 |

FOREIGN PATENT DOCUMENTS

| EP | 1847855 A1 | | 10/2007 |
| WO | 2004111681 A1 | | 12/2004 |
| WO | WO 2006/034585 | * | 4/2006 |
| WO | 2006107727 A2 | | 10/2006 |

* cited by examiner

*Primary Examiner* — David Porta
*Assistant Examiner* — Mindy Vu

(57) ABSTRACT

In nuclear imaging, solid state photo multipliers (48) are replacing traditional photomultiplier tubes. One current problem with solid state photomultipliers, is that they are difficult to manufacture in the size in which a typical scintillator is manufactured. Resultantly, the photomultipliers have a smaller light receiving face (50) than a light emitting face (46) of the scintillators (44). The present application contemplates inserting a reflective material (52) between the solid state photomultipliers (48). Instead of being wasted, light that initially misses the photomultiplier (48) is reflected back by the reflective material (52) and eventually back to the radiation receiving face (50) of the photomultiplier (48).

23 Claims, 7 Drawing Sheets

LIGHT DETECTION IN A PIXELATED PET DETECTOR

CROSS REFERENCE TO RELATED APPLICATIONS

This application claims the benefit of U.S. provisional application Ser. No. 60/892,890 filed Mar. 5, 2007, which is incorporated herein by reference.

DESCRIPTION

The present application relates to the diagnostic imaging arts. It finds particular application to nuclear imaging. Although described with reference to positron emission tomography (PET), it is to be appreciated that the present application relates more generally to pixilated detectors in which an array of scintillator material is coupled to an array of photodetectors, such as in single photon emission computed tomography (SPECT). The present application is also applicable to high energy physics experiments and in astronomy and astrophysics.

In past nuclear imaging devices, gamma radiation detectors employed scintillators that convert incident gamma radiation into light, which is then detected by photomultiplier tubes (PMTs). As Due to several drawbacks to photomultiplier tubes, there is interest in replacing them with solid state light sensors, such as avalanche photodiodes driven in a Geiger mode, called e.g., silicon photomultipliers (SiPMs). Typical SiPMs have better timing and energy resolution than typical PMTs. Exact timing, down to the nanosecond range is becoming more valuable as time of flight PET (TOF-PET) scanners are becoming more prevalent. But there have been serious impediments to adopting this new technology.

Typically, a scintillator, such as a lantium-bromide scintillator, has a light emitting face that is about 4×4 mm Currently, it is cost prohibitive to manufacture SiPMs that large. Typical SiPMs are manufactured more reliably in 3×3 mm or smaller sizes. This is because that the probability of bad sections of the pixel increases over proportionally to the pixel area. For example it is easier to produce four good 2×2 mm SiPMs than it is to produce one good 4×4 mm SiPM. A 2×2 mm SiPM has a smaller radiation receiving face than the radiation emitting face of a 4×4 mm scintillator. If 2×2 mm SiPMs were coupled with an array of 4×4 mm scintillators, there would be dead space where there is no response to light output by the scintillators between the SiPMs.

The consequence of this dead space between SiPMs is that some light emitted by the scintillator will not be collected by the SiPM. In the example of a 4×4 mm scintillator coupled to a 2×2 mm SiPM, the collection efficiency is reduced to 25% based relative to a 4×4 mm SiPM, three-fourths of the light output is lost. With a 3×3 mm SiPM coupled to a 4×4 mm scintillator, the efficiency is 56%. This reduced detection efficiency degrades spatial, energy, and time resolution by about a square root of the area fraction, that is, by a factor of 2 for the 2×2 mm SiPM and by a factor of 1.34 for the 3×3 mm SiPM.

Another drawback of SiPMs is that they are more sensitive to red-green wavelengths and less sensitive to blue wavelengths, as emitted by most current scintillators.

The present application provides a new and improved radiation detection apparatus and methods for its manufacture that overcome the above-referenced problems and others.

In accordance with one aspect, a radiation detector is provided. The detector includes a scintillator that emits light in response to being struck by radiation of a characteristic energy level. The scintillator has a light output face of a first area. The detector also includes a solid state photomultiplier that has a light receiving face of a second area optically coupled to the scintillator. The light receiving face is smaller than the light output face of the scintillator. Reflective material is disposed on portions of the scintillator light output face that are not optically coupled to the solid state photomultiplier light receiving face.

According to another aspect, a method of diagnostic imaging is provided. A subject is placed in an imaging region of a diagnostic imaging device. The subject is injected with a radiopharmaceutical. Radiation caused by the radiopharmaceutical is detected with a detector array. The detector array includes a plurality of individual detectors. Each detector includes a scintillator that emits light in response to being struck by radiation of a characteristic energy level optically coupled to a solid state photomultiplier. Each photomultiplier has a radiation receiving face smaller than a radiation emitting face of each scintillator. Light created by the scintillator not initially received by the photomultiplier is reflected back to the photomultiplier. The received radiation is reconstructed into an image representation of at least a portion of the subject.

In accordance with another aspect, a method of constructing a radiation detector array is provided. Silicon photomultipliers or photodiodes are disposed in an array on a substrate. Radiation receiving faces of the photomultipliers or photodiodes are optically coupled to light emitting faces of scintillators. The light emitting faces each have a greater surface area than the radiation receiving face to which it is coupled. Reflective material is disposed in a space between photomultipliers or photodiodes to increase light received on the radiation receiving faces of the photomultipliers.

One advantage lies in more efficient light harnessing.

Another advantage resides in superior timing characteristics.

Another advantage resides in more reliable solid-state light detection.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
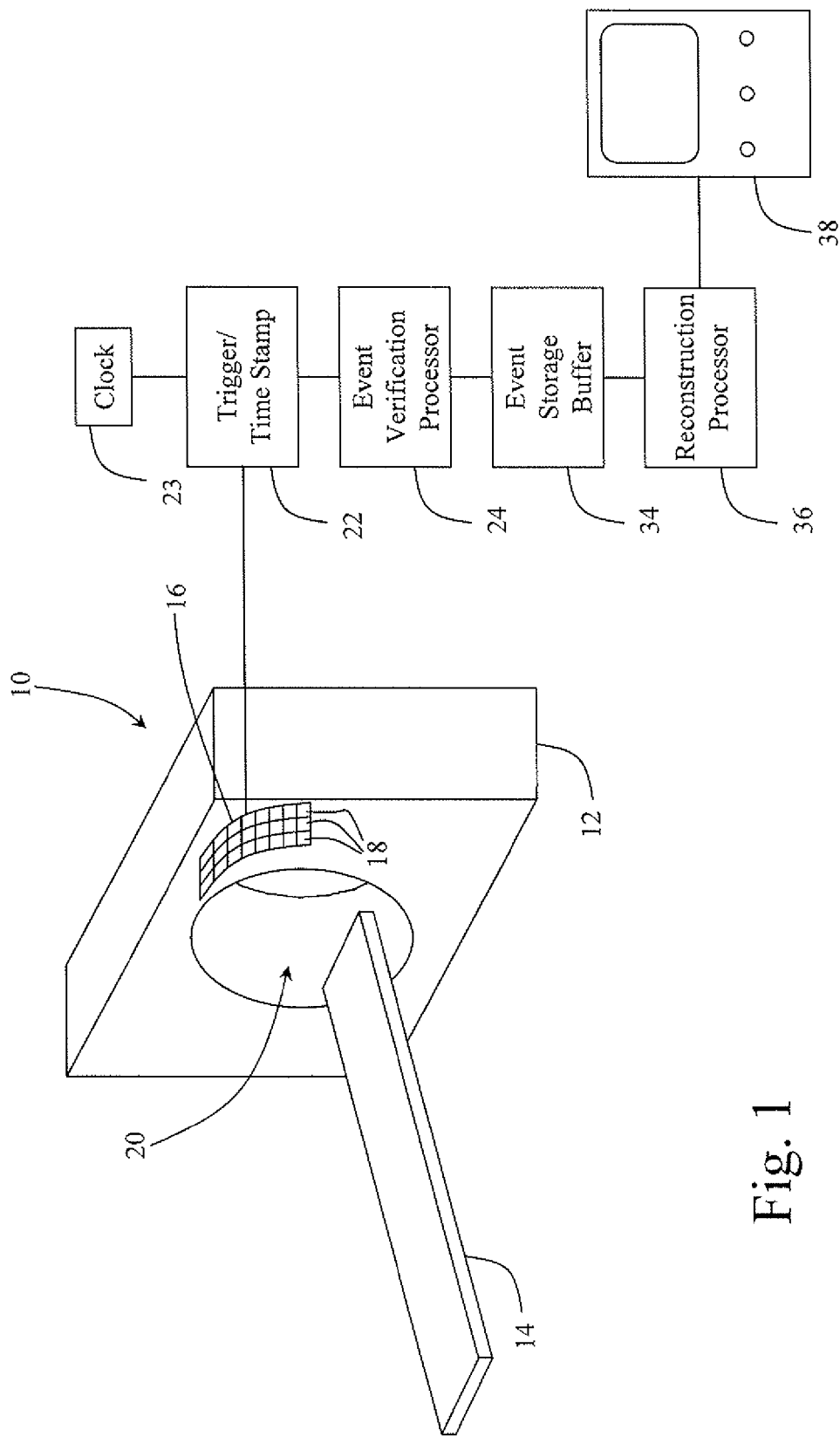
FIG. 1 is a diagrammatic illustration of a diagnostic imaging apparatus, in accordance with the present application.

With reference to FIG. 1, a diagnostic imaging device 10 includes a housing 12 and a subject support 14. Enclosed within the housing 12 is a detector array 16. The detector array 16 includes a plurality of individual detector elements 18. The array 16 is arranged so that detector elements 18 are distributed evenly about an imaging region 20. The detector array 16 can be a ring of detectors 18, multiple rings, or discrete flat panels disposed opposing each other. Whatever the actual placement or arrangement of the detectors 18, it is preferable to arrange the detectors such that each detector has a plurality of counterpart detectors across the imaging region to facilitate coincidence detection. In positron emission tomography (PET), pairs of gamma rays are produced by a positron annihilation event in the imaging region and travel in opposite directions. These gamma rays are detected as pairs, with a slight delay (on the order of nanoseconds) between detections if one gamma ray travels farther to reach a detector than the other.

Before the PET scan commences, a subject is injected with a radiopharmaceutical. The radiopharmaceutical contains a radioactive element coupled to a tag molecule. The tag molecule is associated with the region to be imaged, and tends to gather there through normal body processes. For example, rapidly multiplying cancer cells tend to expend abnormally high amounts of energy duplicating themselves. So, the radiopharmaceutical can be linked to a molecule, such as glucose that a cell typically metabolizes to create energy, gather in such regions and appear as "hot spots" in the image. Other techniques monitor tagged molecules flowing in the circulatory system.

For PET imaging the selected radioisotope emits positrons. The positron can only move a very short distance (on the order of nanometers) before it is annihilated in an annihilation reaction that creates two oppositely directed gamma rays. The pair of gamma rays travel in opposite directions at the speed of light striking an opposing pair of detectors.

When the leading edge of a gamma ray strikes the detector array 16, a time signal is generated. A triggering processor 22 monitors each detector 18 for an energy spike, e.g., integrated area under the pulse, characteristic of the energy of each received gamma ray. The triggering processor 22 checks a clock 23 and stamps each detected gamma ray with a time of leading edge receipt stamp. The time stamp is first used by an event verification processor 24 to determine which gamma rays are a pair which defines a line of response (LOR). Because gamma rays travel at the speed of light, if detected gamma rays arrive more than several nanoseconds apart, they probably were not generated by the same annihilation event and are discarded. Timing is especially important in TOF-PET, as the minute difference in substantially simultaneous events can be used to further localize the annihilation event along the LOR. As computer processor clock speeds become faster, the higher the accuracy with which an event can be localized along its LOR. In a SPECT camera, the LOR or trajectory for each detected gamma ray is determined by collimation.

LORs are stored in an event storage buffer 34, and a reconstruction processor 36 reconstructs the LORs into an image representation of the subject using filtered backprojection or other appropriate reconstruction algorithm. The reconstruction can then be displayed for a user on a display device 38, printed, saved for later use, and the like.

Figure 2:
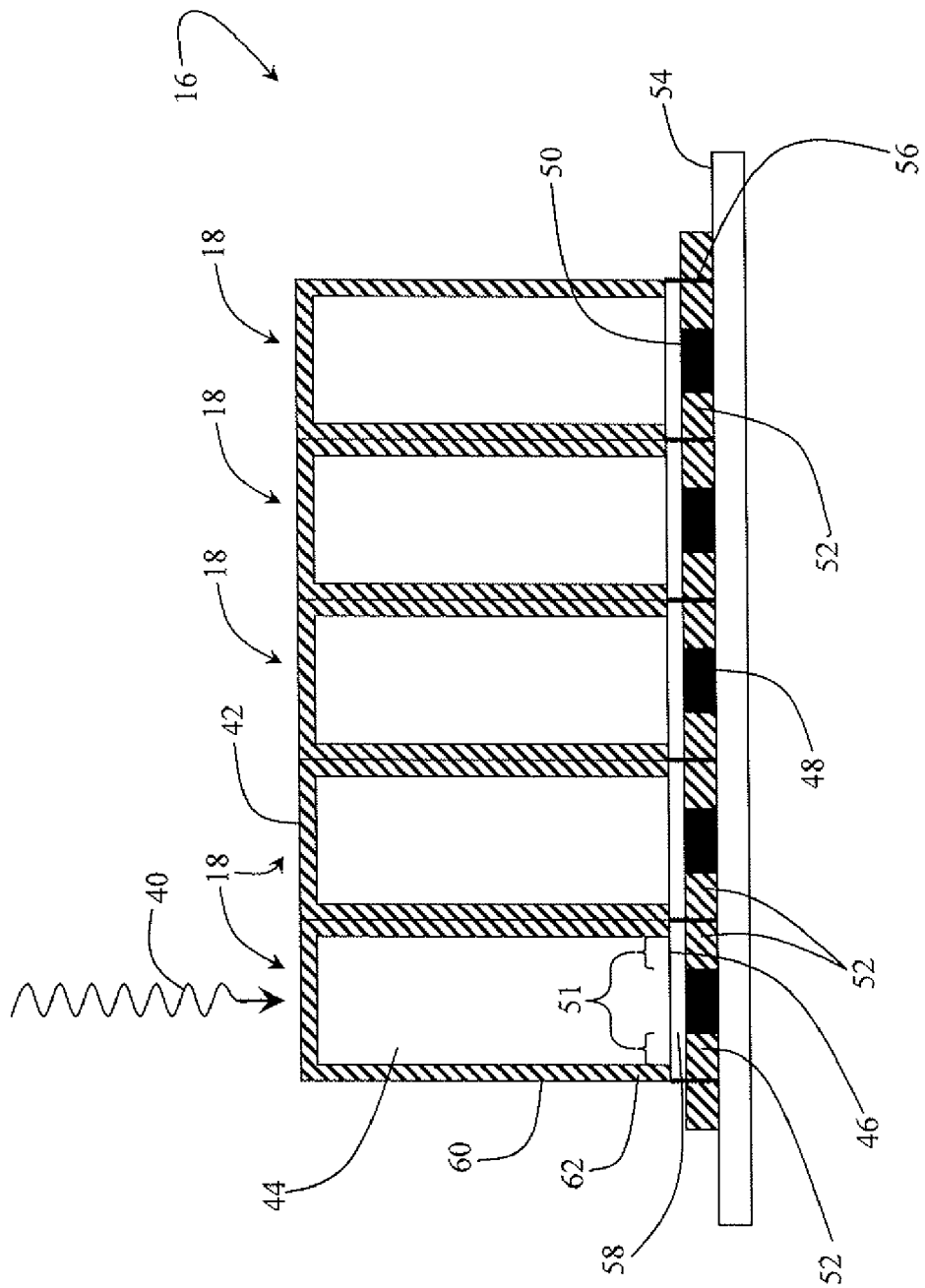
FIG. 2 is a depiction of an array of scintillators and associated photomultipliers in accordance with the present application.

With reference to FIG. 2, a portion of the detector array 16 is shown.

Figure 3:
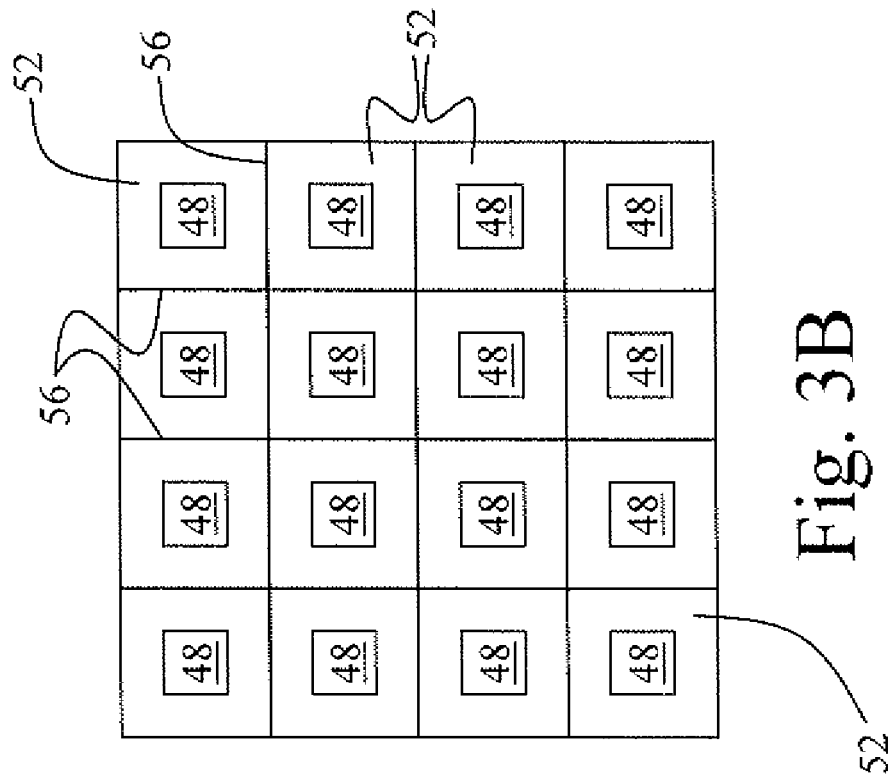
FIG. 3A is a bottom-up view of an array of scintillators and FIG. 3B is a top-down view of a mating array of photomultipliers surrounded by reflective material and guard rings.

When a gamma ray 40 strikes the detector array 16 it interacts with one of the individual detector elements 18. First, the gamma ray 40 passes through a light reflective, gamma ray transmissive top coat 42 and strikes a scintillator 44. The scintillator 44 converts the gamma ray 40 into a burst of light comprising multiple photons. Some of the photons pass through a light emitting face 46 of the scintillator 44 and hit a solid state photomultiplier 48, such as an SiPM. The light emitting face 46 of the scintillator is larger in surface area than a light receiving face 50 of the photomultiplier 48, e.g. 4×4 mm vs. 2×2 mm Resultantly, there is dead space 51 between photomultipliers which do not convert incident light into electrical current or potential. This can be seen also in mating FIGS. 3A and 3B.

Only a fraction of light from the scintillation burst strikes the photomultiplier directly. With reference again to FIG. 2, a light reflective material 52 is disposed in the dead space 51 between photomultipliers 48. The reflective material 52 is preferably a white material. The reflective material 52 can be an initially liquid substance that flows between the photomultipliers and later hardens. The reflective material 52 can also be printed on a substrate 54 using offset printing techniques or applied to the light emitting face of the scintillator. With the reflective material 52 in place, photons that try to exit from the radiation emitting face 46 of the scintillator 44 in the dead space are reflected back up into the scintillator 44 and eventually to the photomultiplier 48. The photomultipliers 48 and the reflective material 52 are preferably applied directly to the substrate 54, such as a printed circuit board, a ceramic substrate, or a flex-foil. Also mounted to the substrate are reflective guard rings 56 that separate each photomultiplier 48 to prevent cross-talk between photomultipliers.

Disposed between the scintillators 44 and the photomultipliers 48 is a layer of index matching material 58, such as optical coupling grease. When light reaches a boundary between materials, and the materials have different indices of refraction, some of the light will be transmitted, and some reflected. Because reflection is not desired between the scintillator 44 and the SiPM, the index matching layer 58 is interposed to minimize reflection. Everywhere else, however, reflection is desired to channel as much of the scintillated light as possible into the photomultiplier 48. Thus, the scintillators 44 themselves are encased in a reflective layer 60. In this manner, the light reflected by the reflective surface 52 is reflected by the reflective top layer 42 and the reflective side layers 60 to the photomultiplier 48.

Figure 4:
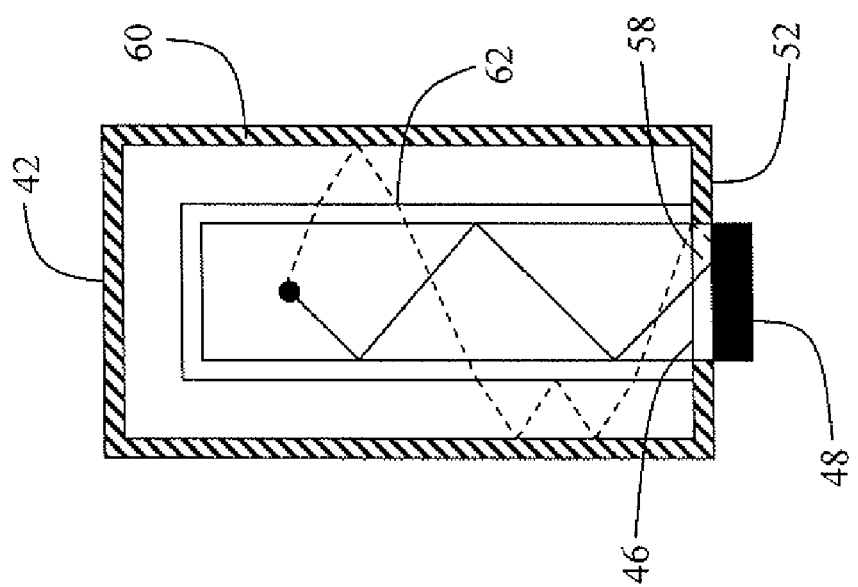
FIG. 4 shows internal reflections of light in a single scintillator.

Preferably, the photomultipliers 48 are solid state silicon photomultipliers, (SiPM) but it is to be understood that photodiodes are also viable, and are certainly contemplated. SiPMs are most sensitive to the green and longer wavelengths of visible light. Typically, exemplary Lantium Bromide scintillators, like many commonly used scintillators, emit light in the shorter, blue wavelengths. Other scintillators, such as cadmium tungstate, (CdW) bismuth germanium oxide, (BGO) gadolinium orthosilicate, (GSO) cerium doped lutetium orthosilicate, (LSO) cerium doped lutetium yttrium orthosilicate, (LYSO) lead sulfate, cerium fluoride, cerium doped lanthanum fluoride, and the like are also contemplated. The SiPMs 48 can still detect the blue wavelengths, but can detect green or longer wavelengths more efficiently. A wavelength shifting material 62 is disposed between the scintillators 44 and the reflective coatings 60 on at least the vertical sides of the scintillators 44 to shift emitted light from the blue portions of the spectrum to the green. When applied to the surface of the scintillator, the wave shift material optionally has an index of refraction or reflectivity that encourages internal reflection. A view of a single scintillator 44 is shown in FIG. 4. Part of the blue light is transferred to the light emitting face 46 via total internal reflections, while other portions of the blue light are shifted by the wavelength shifter 62 to green light. An air gap between the scintillator 44 and the reflector 60 ensures that part of the blue light reaches the light emitting face 46 via total internal reflections, without wavelength shifting due to the index of refraction or reflectivity of the wavelength shift layer 62. Transmission via total internal reflection is efficient and enables good timing. The light that is wavelength shifted reaches the light emitting face 46 via an increased number of reflections. The wavelength shifting material 62 can also be applied to the reflective material 52, 42, and/or 62 and the region between the scintillator and the reflector could be a waveguide material.

Figure 5:
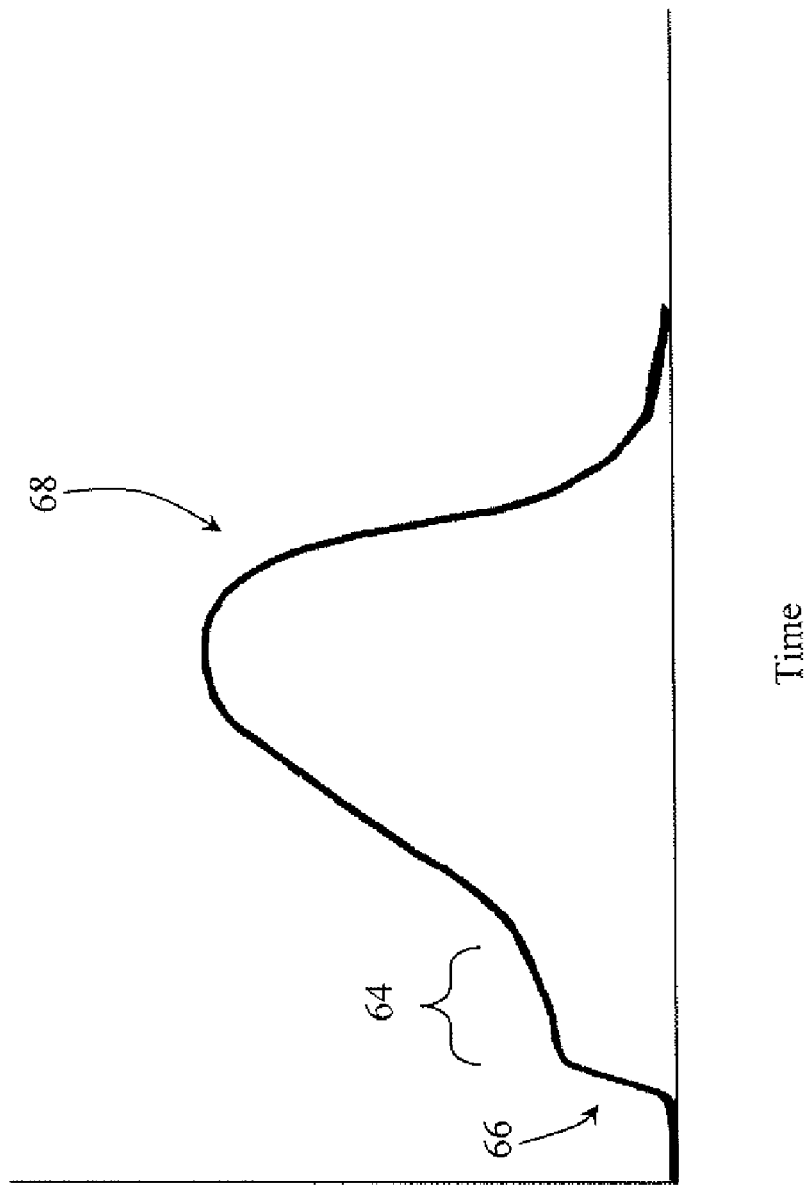
FIG. 5 is a current response graph of an exemplary photomultiplier as a function of time.

A known drawback of this type of wavelength shifting is that it slows the response, which blurs the temporal resolution. To account for this drawback, the radiation emitting face 46 is not coated in wavelength shifting material, so that unshifted scintillated light has a direct path to the photomultiplier. With reference to FIG. 5, this results in the initial blue light peak portion 64 with a sharp leading edge 66, i.e. excellent temporal resolution for generating accurate time stamps and weaker energy resolution. The lower amplitude blue peak portion is followed by a larger green peak portion 68 with excellent energy resolution, but weaker temporal resolution. Thus, the temporal resolution is preserved by omitting the shifting material 62 on the radiation emitting face 46 of the scintillator. At the same time, energy resolution is preserved.

Figure 6:
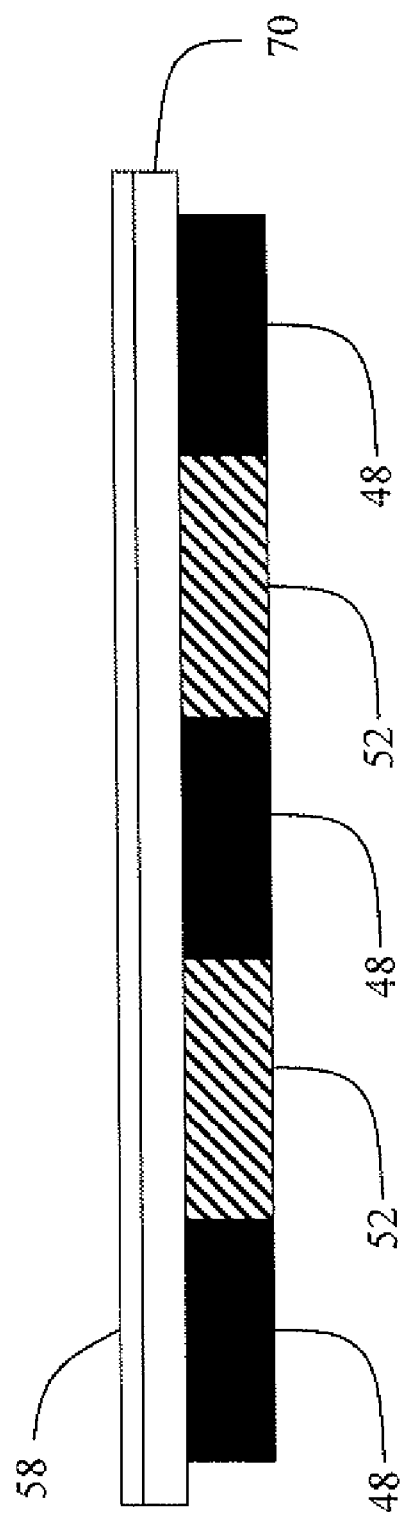
FIG. 6 shows an embodiment that includes photomultipliers bonded to the underside of a clear flex foil substrate.
Figure 7:
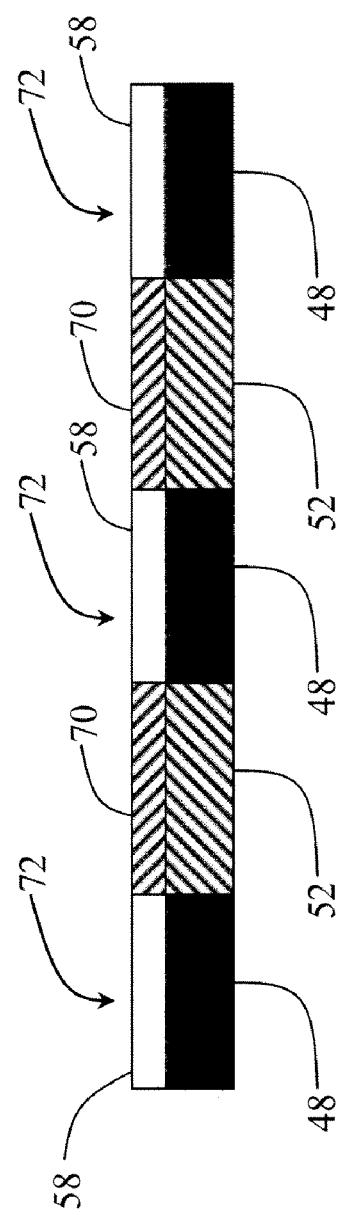
FIG. 7 shows an embodiment similar to that of FIG. 6, except with holes in the flex foil substrate above the photomultipliers.

Other configurations of the solid state photomultipliers 48 are also viable options. With reference to FIG. 6, the SiPMs 48 are disposed beneath a clear flex foil substrate 70. Disposing the SiPMs 48 below the flex foil 70 facilitates bump bonding to the foil 70. Index matching material 58 is, again, disposed to lessen loss of light due to reflections. Reflective material 52 is again disposed in the dead space between SiPMs 48. As shown in the embodiment of FIG. 7, holes 72 are cut in the flex foil or other substrate 70. The holes 72 are situated above the solid state photomultipliers 48. The opposite surface of the substrate 70 is rendered reflective to reflect light back to a coupled scintillator 44. The holes 72 are filled with optical coupling material 58 to provide a non-reflective coupling between the scintillator 44 and the SiPM 48.

In yet another viable configuration, multiple discrete photomultipliers can be used to receive scintillations from a single scintillator. For example, four 2×2 mm photomultipliers can be used to receive light from a 4×4 mm scintillator.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A radiation detector comprising:
a) a scintillator that emits light of a first wavelength in response to being struck by radiation of a characteristic energy level, the scintillator having a light output face of a first area;
b) a solid state photomultiplier having a light receiving face of a second area optically coupled to the scintillator by an index matching material, the light receiving face of the solid state photomultiplier being smaller than the light output face of the scintillator such that a portion of the first wavelength light emitted by the scintillator travels through the scintillator directly to the light receiving face of the solid state photomultiplier;
c) reflective material disposed facing portions of the scintillator not optically coupled to the solid state photomultiplier light receiving face, the reflective material reflecting another portion of the light emitted by the scintillator back into the scintillator; and,
d) a wavelength shifting material disposed between the scintillator and the reflective material, the wavelength shifting material shifting the wavelength of the light reflected by the reflective material to a shifted wavelength to which the solid state photomultiplier is more sensitive, such that the shifted wavelength light undergoes at least one reflection before traveling to the light receiving face of the solid state photomultiplier.

2. The detector as set forth in claim 1, wherein the reflective material includes a reflective layer encasing faces of the scintillator not coupled to the light receiving face of the solid state photomultiplier.

3. The detector as set forth in claim 1, wherein the wavelength shifting material is not disposed between the scintillator and the light receiving face of the solid state photomultiplier such that when a radiation event strikes the scintillator, the light of the first wavelength travels in part directly to the solid state photomultiplier and in part to the wavelength shifting material and the reflective layer which reflects the light with the shifted wavelength back into the scintillator, and through the scintillator to the solid state photomultiplier.

4. The detector as set forth in claim 3, wherein the scintillator includes lantium bromide that emits light with a blue wavelength, and the solid state photomultiplier is a silicon photomultiplier that is most sensitive to light with a red through green wavelength, the wavelength shifting material shifting light from blue to green or red.

5. The detector as set forth in claim 1 wherein the wavelength shifting material is integrated into the reflective layer.

6. A detector array comprising:
a plurality of the solid state photomultipliers as set forth in claim 1 arranged in an array.

7. The detector array as set forth in claim 6, wherein the photomultipliers are mounted on a substrate that includes at least one of a printed circuit board, a ceramic substrate, and a flex-foil and disposed adjacent apertures in the substrate from a side of the substrate opposite to the scintillators, and an optical coupling filler is disposed between the light emitting faces of the scintillators and the light receiving faces of the solid state photomultipliers.

8. The detector array as set forth in claim 6, wherein the ratio of scintillators to solid-state photomultipliers is 1:1.

9. A diagnostic imaging apparatus comprising:
the detector array as set forth in claim 6, disposed to detect radiation from a subject; and
a reconstruction processor for reconstruction the detected radiation events into an image representation.

10. A PET diagnostic imaging apparatus comprising:
the detector array as set forth in claim 6, disposed to detect radiation from a subject, the detector array being disposed to receive both of an oppositely directed pair of gamma rays traveling in opposite directions along a line of response (LOR) from a position annihilation event and further including:
a processor or means for determining a time interval between detection of the pair of detected gamma rays; and
a reconstruction processor which reconstructs the LORs and the time intervals from a plurality of detected gamma ray pair into the image representation.

11. The PET diagnostic imaging apparatus as set forth in claim 10 wherein an air gap is defined between the scintillator and the reflective material.

12. The PET diagnostic imaging apparatus as set forth in claim 10 wherein the wavelength shifting material has an index of refraction that encourages internal reflection.

13. The radiation detector as set forth in claim 1 wherein the radiation includes gamma rays of the characteristic energy level and the scintillator creates a pulse of light in response to each gamma ray and the solid state photomultiplier receives a portion of the light directly to generate an initial peak portion of an output electrical pulse and the shifted wavelength light after one or more reflections to form a subsequent peak portion.

14. The radiation detector as set forth in claim 13 wherein the initial peak portion provides a sharp leading edge for temporal resolution and the subsequent peak portion provides energy resolution.

15. The radiation detector as set forth in claim 14 wherein the initial peak portion has a lower amplitude than the subsequent peak portion.

16. The radiation detector as set forth in claim 1 wherein the solid state photomultiplier generates an output electrical pulse which includes an initial peak portion generated in response to the light which travels directly to the light receiving face and a subsequent peak portion generated in response to reflected and wavelength shifted light.

17. A detector array comprising a plurality of radiation detectors arranged in an array, each detector comprising:
   a) a scintillator that emits light in response to being struck by radiation of a characteristic energy level, the scintillator having a light output face of a first area;
   b) a solid state photomultiplier having a light receiving face of a second area optically coupled to the scintillator the light receiving face of the solid state photomultiplier being smaller than the light output face of the scintillator;
   c) a flex-foil disposed between the solid state photomultiplier and the scintillator, the flex-foil having an aperture aligned with and sized to match the solid state photomultiplier;
   d) an optical coupling filler disposed in the flex-foil aperture between the light emitting faces of the scintillator and the light receiving face of the solid state photomultiplier;
   e) light reflective material disposed surrounding the solid state photomultiplier to prevent light cross-talk between solid state photomultiplier and neighboring photomultipliers of the array, the reflective material disposed facing the scintillator and covering portions of the light output face of the scintillator that are not optically coupled to the solid state photomultiplier light receiving face to reflect light back into the scintillator.

18. The detector array as set forth in claim 17, wherein an air gap is disposed between the reflective material and the scintillator.

19. A method of diagnostic imaging comprising:
   placing a subject in an imaging region of a diagnostic imaging device;
   injecting the subject with a radiopharmaceutical;
   with a detector array, detecting radiation of a characteristic energy level caused by the radiopharmaceutical, the detector array including a plurality of individual detectors, the detectors each including a scintillator crystal that creates light of a characteristic wavelength in response to being struck by radiation of the characteristic energy level, the scintillator crystal having a light emitting face optically coupled to a solid state photomultiplier and other faces not optically coupled to the solid state photomultiplier, the photomultiplier having a radiation receiving face smaller than a radiation emitting face of the scintillator crystal;
   transmitting a portion of the light of the characteristic wavelength through the scintillator crystal to the solid state photomultiplier;
   reflecting another portion of the light created by the scintillator crystal back into the scintillator crystal;
   shifting a wavelength of at least a portion of the reflected light to a shifted wavelength to which the solid state photomultiplier is more sensitive than the light of the characteristic wavelength;
   transmitting the reflected light with the shifted wavelength through the scintillator crystal to the solid state photomultiplier; and,
   reconstructing received radiation into an image representation of at least a portion of the subject.

20. The method as set forth in claim 19, wherein the detected radiation caused by the radiopharmaceutical includes a plurality of radiation events and further including:
   in response to being struck by each radiation event, with the scintillator crystal creating a light pulse of the characteristic wavelength, the portion of the light pulse which travels directly to the solid state photomultiplier arrives first and the portion of the light pulse with the shifted wavelength arrives subsequently;
   with the solid state photomultiplier, generating an output electrical pulse which has an initial portion responsive to the characteristic wavelength light with a sharp leading edge for temporal resolution and a subsequent portion responsive to the shifted wavelength light for energy resolution.

21. A method of constructing a radiation detector array comprising:
   disposing silicon photomultipliers in an array on a substrate, each photomultiplier having a light receiving face;
   arranging a plurality of scintillators in an array with reflective material in a space between scintillators to increase light emitted at light emitting faces of each of the scintillators;
   optically coupling radiation receiving faces of the array of photomultipliers on the substrate to the light emitting faces of the array of scintillators, the light emitting faces each having greater surface area than the radiation receiving face of the photomultiplier to which it is coupled.
   disposing reflective material adjacent a portion of the light emitting face of each individual scintillator which is not optically coupled to the light receiving face of one of the photomultipliers; and,
   disposing a wavelength shifting material between each scintillator and at least a portion of the reflective material such that each scintillator emits light of more than one wavelength from its light emitting face.

22. The method as set forth in claim 21, wherein the scintillator emits light of a first wavelength and the wavelength shifting material shifts light of the first wavelength to a second wavelength, and the optically coupling includes:
   optically coupling the photomultiplier directly to the scintillator such that a first portion of the light of the first wavelength passes through the scintillator directly to the solid state photomultiplier and a second portion of the first wavelength light is shifted to the second wavelength by the wavelength shifting material and reflected one or more times before passing to the solid state photomultiplier.

23. The method as set forth in claim 22 wherein the disposing of wavelength shifting material includes:
   disposing the wavelength shifting material such that the second wavelength travels to the solid state photomultiplier only through the scintillator.

* * * * *